United States Patent [19]

Lentz

[11] Patent Number: 4,833,523

[45] Date of Patent: May 23, 1989

[54] CHROMA CRAWL ELIMINATION WITHOUT ANY CUMULATIVE DIFFERENCE IN FRAME TIME

[75] Inventor: John T. Lentz, Sherman Oaks, Calif.

[73] Assignee: High Resolution Sciences, Inc, Los Angeles, Calif.

[21] Appl. No.: 176,643

[22] Filed: Apr. 1, 1988

[51] Int. Cl.[4] .............................................. H04N 9/44
[52] U.S. Cl. ....................................... 358/17; 358/16
[58] Field of Search ..................... 358/16, 17, 148, 150

[56] References Cited

U.S. PATENT DOCUMENTS 4,660,074 4/1987 Schine .................................... 358/17
4,661,840 4/1987 Phelps .................................... 358/16

Primary Examiner—James J. Groody
Assistant Examiner—David E. Harvey
Attorney, Agent, or Firm—Freilich, Hornbaker, Rosen & Fernandez

[57] ABSTRACT

Chroma crawl, and a 15 Hz component introduced by the NTSC subcarrier pattern repeated every four fields, is obviated by adding to and substracting from the horizontal and vertical sync timing of alternate frames the period of one half cycle of the color subcarrier. Upon encoding television color signals with the color subcarrier for transmission in a compact video signal with the horizontal and vertical signals generated by this method, a chroma crawl free composite video signal results without producing any cumulative timing difference.

3 Claims, 1 Drawing Sheet

CHROMA CRAWL ELIMINATION WITHOUT ANY CUMULATIVE DIFFERENCE IN FRAME TIME

BACKGROUND OF THE INVENTION

This invention relates to NTSC color television transmission (broadcast or cable), and/or recording for later transmission or display on a conventional NTSC monitor or television receiver, and more particularly to an improved sync generator for producing an NTSC composite color signal to be transmitted free from chroma crawl.

To make the frequency spectrum of color and luminance interleave, the NTSC frame and line frequencies were chosen in order to make the color subcarrier an odd multiple of half the frame and line frequencies. Each line contains 227.5 subcarrier cycles and each frame contains 119,437.5 subcarrier cycles. Each field ends with the subcarrier 90° out of phase from the previous one. Consequently, color subcarrier cycles are present in the same phase at each consecutive scanning field one line higher. This causes the artifact known as chroma crawl. The standard NTSC subcarrier pattern is repeated every four fields, which introduces a 15 Hz component in the image display which can be noticeable and disturbing at edges of certain details in the picture.

Methods for producing composite color signals without chroma crawl in NTSC color television transmission are disclosed in U.S. Pats. Nos. 4,660,074 and 4,661,840. The methods suggested in those patents are based on slightly changing the length of horizontal scanning lines or fields at the source to end each scan line with one full color subcarrier cycle, thus shortening each raster (horizontal scan line) to 227 color subcarrier cycles, or to end each field with 59,718.5 cycles of the color subcarrier, instead of 59,718.75 cycles. As a consequence, there is a time differential between a full NTSC frame and a frame derived by the methods of these two patents.

SUMMARY OF THE INVENTION

In accordance with the present invention, at the beginning of each frame of a color television signal, an offset of 140 ns (one half of a color subcarrier cycle) is applied to the horizontal sync timing to alternately add and subtract 140 ns from the horizontal timing of each frame. As a consequence, the average of the alternately added and subtracted 140 ns is zero so that there is no cumulative time difference between the NTSC and the chroma-crawl free (CCF) signal. However, the alternate plus and minus 140 ns time difference from frame to frame produces a spatial relationship between the subcarrier and the lines scanned that remains the same for every frame, thus not only eliminating chroma crawl but also the 15 Hz component. This constant spatial relationship between the subcarrier and the line scan frequency is achieved in the sync generator by alternately adding and subtracting 140 ns to and from the vertical sync timing.

The novel features that are considered characteristic of this invention are set forth with particularly in the appended claims. The invention will best be understood from the following description when read in connection with the accompanying drawings.

DESCRIPTION OF THE PREFERRED EMBODIMENTS

Figure 1:
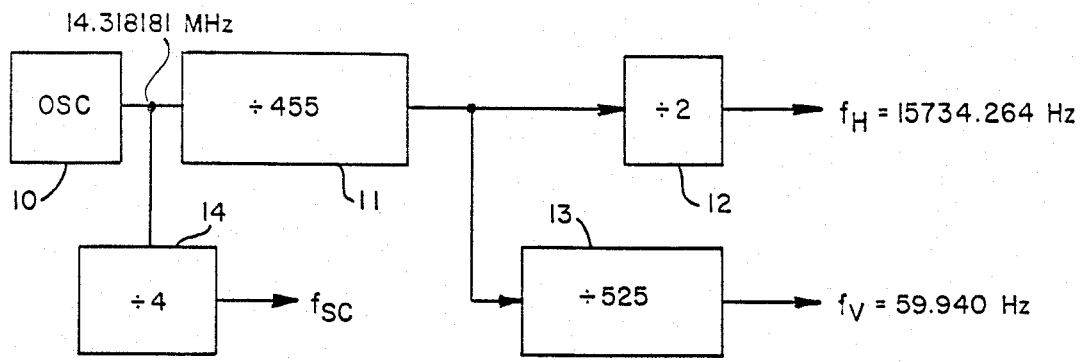
FIG. 1 illustrates the prior art method of generating horizontal and vertical sync pulses for NTSC color television.

Referring to FIG. 1, a sync generator used by television systems, including cameras, camcorders and receivers, consists of a stable crystal oscillator 10 running at four times the NTSC color subcarrier frequency ($4f_{sc}$=14.318181 MHz). The output of the oscillator 10 is divided by 455 in a counter 11, and then divided by 2 in a counter 12 to obtain the NTSC horizontal scanning frequency, and by 525 in a counter 13 to obtain the NTSC vertical scanning frequency. In the meantime, the output of the oscillator 10 is divided by 4 in a counter 14 to produce a color subcarrier frequency $f_{sc}$ equal to 3.579545 MHz.

Figure 2:
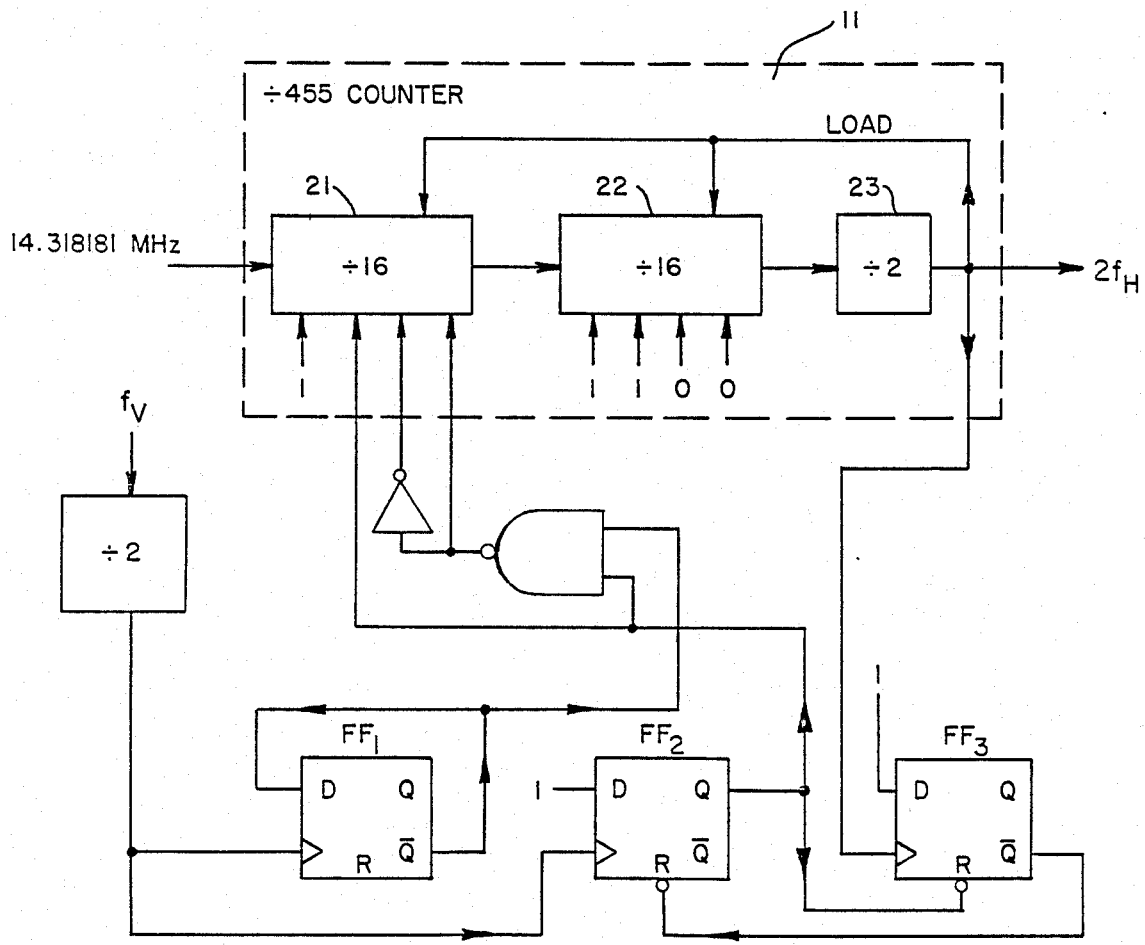
FIG. 2 illustrates a new sync generator for alternately adding and subtracting 140 ns to and from the horizontal sync in alternate frames to produce in each frame the same number of horizontal sync pulses which have a constant relationship with the color subcarrier, namely 227½ color subcarrier cycles per line, except one line in each which has 227 and 278 cycles in alternate frames without introducing any cumulative time difference in the frame.

The counter 11 is shown in FIG. 2 to be comprised of a chain of counters. For the present invention, the counter 11 is preset to alternately count 453 and 457 during successive frames of 525 lines. When the counter 11 overflows, it switches to the alternate preset count, thus shortening or lengthening the frame by one half cycle of the color subcarrier at the frequency $f_{sc}$.

FIG. 2 illustrates by a specific example how the divide-by-455 counter is preset to alternately count during the first line of each successive frame and is implemented using two divide-by-16 counters 21 and 22 and one divide-by-2 counter 23 connected in cascade for dividing by 455. This chain of counters normally divides by 512, but is altered to divide nominally by 455 by presetting the chain to a count of 57 (binary 000111001). By changing the preset loaded into the counter 11 from 57 to 55 (binary 000110111) and 59 (binary 000111011), the count of 455 for the chain of counters is alternately shifted to 457 and 453, respectively, thus adding to and subtracting from consecutive frames a timing period of 140 ns, which is one half cycle of the color subcarrier.

The alternate presetting to 457 and 453 in consecutive frames is controlled by three D-type flip-flops, $FF_1$, $FF_2$, and $FF_3$. Flip-flop $FF_1$ is clocked at the frame rate of 30 Hz to change its state every frame. That controls alternating the preset binary numbers entered into the counter 21 at the start of each frame to alternately add or subtract 2 from the nominal count of 455.

At the start of each frame, flip-flop $FF_2$ is clocked to the set state (Q high). If the flip-flop $FF_1$ is set ($\overline{Q}$ low), the input to NAND gate 24 is 01 and its output is 1. The binary number preset in the counter 21 is then 1011. The next output from the divide-by-two counter 23 loads that preset binary number in the counter 21 and a constant binary number 0011 into the counter 22. Those four bits, and the bit 1 in the least significant bit position of the counter 21, are constant preset digits that are part of causing the cascaded counters to divide nominally by 455. Only more significant bits alternately preset in the counter 21 are involved in controlling the divide-by-455 counter to instead divide during the first line of successive frames by 453 and 457, alternately.

At the conclusion of a preset load, flip-flop $FF_3$ is clocked to the set state to reset the flip-flop $FF_2$. At the start of the next frame, the flip-flop $FF_1$ is reset so the Q output of the flip-flop $FF_1$ is high and the flip-flop $FF_2$ is again set, so the input to the NAND gate is 11 and its output is 0. The binary number 0111 is then presented to the preset inputs and loaded by the next output of the divide-by-two counter 23. In that manner the two most significant bits of the preset number is switches between 10 and 01 as the state of the flip-flop $FF_2$ changes every frame.

From the foregoing, it is seen that the sync generator alternately adds and subtracts from the horizontal sync signal 140 ns (one half cycle of the color subcarrier) in successive frames. Alternating between addition and subtraction is controlled by the state of flip-flop $FF_1$ which is clocked to change state at the beginning of every frame. At the end of each frame, a load signal causes the sync generator frequency counter to preset according to whether the flip-flop $FF_1$ is at that time set or reset. The extent of the period added and subtracted is controlled by the binary number preset in the counter 21 which alters the count of the chain of counters from 455 to 453 and 457, alternately. Thus, the sync generator counter alternately adds to and subtracts from successive frames a period of one half a subcarrier cycle. Consequently, while each pair of successive frames are lengthened and shortened by one half cycle of the color subcarrier, the average over every two frames is zero, so there is no cumulative difference in frame time over the entire video program signal.

Although a particular embodiment of the sync generator and its control has been illustrated and described, it is recognized that variations and modifications may readily occur to those skilled in the art. Consequently, it is intended that the claims be interpreted to cover such modification and variations as come within the true scope of the invention.

What is claimed is:

1. A method of generating sync signals for an improved composite color television signal having a color subcarrier and being compatible with NTSC standards comprised of introducing once per frame, an offset of alternately plus and minus the period of one half cycle of color the subcarrier to the horizontal sync timing of each successive frame, and maintaining the offset of the horizontal sync timing constant within each frame while maintaining the phase and frequency of the color subcarrier constant throughout successive frames, thereby maintaining the spatial relationship between cycles of the subcarrier and scanning lines constant for every frame.

2. The method for an improved color television signal as defined in claim 1 wherein said horizontal sync timing is generated by dividing down a clock frequency of four times the frequency of said color subcarrier in a counter, and dividing down the output of said counter to obtain horizontal sync and vertical sync signals, and said offset is produced by presetting said counter with alternately plus and minus a predetermined count at the start of successive frames.

3. Apparatus for generating sync signals for an improved composite color television signal having a color subcarrier and being compatible with NTSC standards comprised of a conventional sync generator for producing NTSC horizontal and vertical sync signals at 15,734.264 Hz nad 59.940 Hz, respectively, having a stable oscillator operting at a frequency that is four times the color subcarrier and therefore a greater multiple of said horizontal sync signal frequency, means for dividing said oscillator frequency by said greater multiple, to generate the horizontal sync signals said dividing means comprising a chain of counters, means for introducing an offset in a count held by said chain of counters at the beginning of each frame during generation of the horizontal sync signal for the first line of each frame, said offset alternately representing plus and minus the period of one half cycle of the color subcarrier and means for dividing said oscillator frequency by four to produce the color subcarrier with a frequency equal to 3.579545 MHz, whereby the phase and frequency of the color subcarrier remains constant throughout successive frames, thereby maintaining the spatial relationship between cycles of the subcarrier and scanning lines constant for every frame.

* * * * *